No. 656,172. Patented Aug. 21, 1900.
J. R. COLT.
VEHICLE TIRE FASTENER.
(Application filed Apr. 14, 1900.)

(No Model.)

Witnesses

Inventor:
James R. Colt,
by _____
Attorneys

UNITED STATES PATENT OFFICE.

JAMES R. COLT, OF BATAVIA, NEW YORK.

VEHICLE-TIRE FASTENER.

SPECIFICATION forming part of Letters Patent No. 656,172, dated August 21, 1900.

Application filed April 14, 1900. Serial No. 12,868. (No model.)

*To all whom it may concern:*

Be it known that I, JAMES R. COLT, a citizen of the United States, residing at Batavia, in the county of Genesee and State of New York, have invented a new and useful Vehicle-Tire Fastener, of which the following is a specification.

My invention relates to vehicle-tires, and more particularly to the means for securing elastic tires to the rim, so as to increase their elasticity and also prevent the entrance of foreign substances between the tire and the rim; and it consists in the improved construction and novel arrangement of parts of a tire, as will be hereinafter more fully set forth.

Figure 1:
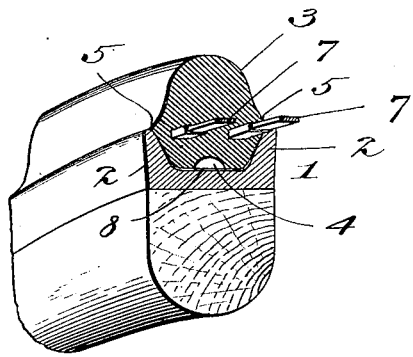
Figure 2:
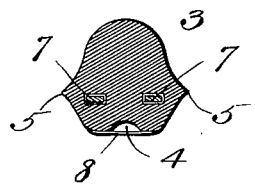
Figure 3:
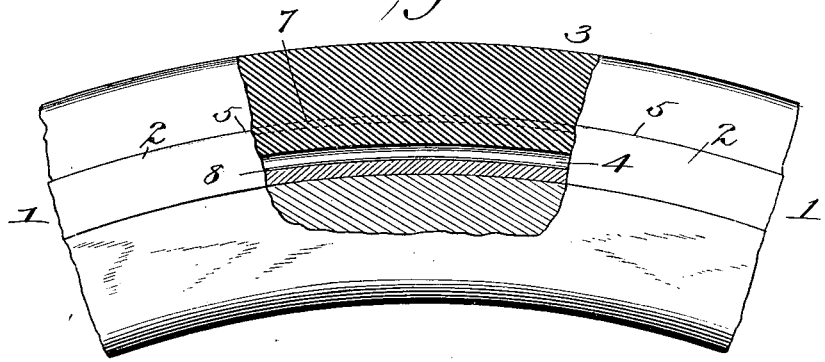

In the accompanying drawings, in which the same reference-numerals indicate corresponding parts in each of the views in which they occur, Figure 1 is a sectional perspective view of a portion of a vehicle-wheel embodying my invention. Fig. 2 is a transverse sectional view of the tire detached, and Fig. 3 is a central mid-sectional view of a portion of the rim of the wheel with the tire in position.

Referring more particularly to the drawings, 1 indicates the rim of a tire, which may be formed in any desired manner and provided with two diverging wings or edges 2, within which is located the tire 3.

The tire is preferably formed somewhat pyramidal in cross-section, with a substantially-semicylindrical groove 4 in the base extending entirely around the wheel. The sides or the lower or base portion are preferably inclined outward to correspond with the inclined portion of the wings 2 and virtually overlapping the same, while the portions above the wings converge toward each other and form the apex or tread of the wheel, the meeting edges of said inclined portions at the sides of the tire forming a rib or flange 5, which extends entirely around the wheel.

Extending longitudinally around the tire near each rib is a metallic band 7, which is preferably covered with canvas and embedded in the tire when the tire is being formed, the ends of the bands being previously secured together in any desired manner. These bands are located at one side of a direct line above the groove 4 in the base thereof, so that when the tire is in position the strain or inward pull of the bands will each come upon the solid portion at the side of said groove, thereby preventing the collapse of the tire in the said groove, and thus adding to the elasticity of the tire. The outer edges of the bands preferably overlap a portion of the inclined wings, and thereby cause the portion of the tire resting upon the wings to be drawn over tightly into engagement therewith, and thus prevent the passage of foreign substances to the bottom of the rim, where it would cut and grind the tire by the slight movement between the tire and the rim. By making the ribs or flanges at the sides of the tire to extend over the upper edges of the wings of the rim and drawing them tightly thereagainst the entrance of foreign substances between the tire and the rim is prevented and the life or duration of the parts is thus prolonged.

To add to the strength and durability of the tire, I prefer to secure a piece of canvas 8 or other suitable material to the base of the tire, so as to span the groove 4 resting between the tire and the rim.

A tire constructed as above described can be placed in position easily and will be held therein without the use of cement or other securing means, yet it will be impossible for the same to become accidentally displaced from the rim.

Having thus fully described my invention, what I claim as new, and desire to secure by Letters Patent of the United States, is—

1. In a vehicle-wheel, the combination, with a rim provided with flaring wings, of an elastic tire seated therein, the base of which is provided with a longitudinal groove, and the sides of which are provided with a laterally-extending rib to overlap the corresponding wings of the tire, of two flat insulated metallic bands in the main portion of the tire, the inner edges of which are outside of a vertical line drawn from the groove in the base, and the outer edges overhang the bottom portion of said wings, the sides of the tire overlapping the upper portion of said wings, substantially as described.

2. In a vehicle-wheel, the combination, with a rim provided with flaring wings, of an elastic tire seated therein, the base of which is provided with a semicylindrical groove extending longitudinally thereof, and the main portion is provided with two flat metallic bands, and a piece of canvas secured to the base of the tire, so as to span or lap over said groove, substantially as described.

JAMES R. COLT.

Witnesses:
 JAMES A. LE SEUR,
 ELEANORA LE SEUR.